US Patent [19] Moody

[11] 4,252,832
[45] Feb. 24, 1981

[54] MICROWAVE-COOKING BROWNING COMPOSITION

[76] Inventor: Robert D. Moody, 141 Field Grove Ct., East Peoria, Ill. 61611

[21] Appl. No.: 20,416

[22] Filed: Mar. 14, 1979

[51] Int. Cl.$^3$ .............................................. A21D 6/00
[52] U.S. Cl. .................................. 426/241; 426/302; 426/653; 426/658
[58] Field of Search .............. 426/241, 243, 242, 548, 426/658, 652, 302, 305, 466, 653

[56] References Cited

U.S. PATENT DOCUMENTS

| | | | |
|---|---|---|---|
| 3,294,552 | 12/1966 | Topalian | 426/658 |
| 3,773,526 | 11/1973 | Bliznak | 426/548 |
| 3,792,173 | 2/1974 | Globe | 426/92 |
| 3,900,575 | 8/1975 | Rapoport | 426/305 |
| 4,101,680 | 7/1978 | Edwards | 426/302 |

FOREIGN PATENT DOCUMENTS 52-37061  9/1977  Japan ....................................... 426/241

OTHER PUBLICATIONS

*The Extractor,* published by The Extractor Co., p. 112, 1923.
*Microwave Cook Book,* published by Better Homes and Gardens, p. 25, 1976.

*Primary Examiner*—Raymond N. Jones
*Assistant Examiner*—George C. Yeung
*Attorney, Agent, or Firm*—David V. Munnis

[57] ABSTRACT

Aqueous syrup for effecting browning of foods cooked in microwave ovens comprising a melted, carmelized, and foamed disaccharide, alone or in combination with a minor amount of a monosaccharide, subsequently dissolved in water to form the syrup. Microwave-cooked foods, e.g., meats, poultry, fish, eggs, and pastries, such as cakes and pies, which ordinarily come out of the cooking oven appearing white or grey, advantageously when treated by basting or recipe-inclusion with the syrup browning agent of the present invention have a browned appearance of conventionally cooked foods.

8 Claims, No Drawings

MICROWAVE-COOKING BROWNING COMPOSITION

BACKGROUND OF THE INVENTION

In recent years, the use of microwave ovens has become increasingly widespread. Such ovens allow foods to be cooked rapidly, even starting from a frozen state. With the advent of microprocessor circuitry in such ovens, they have become more attractive to consumers, allowing an even higher degree of convenience to be achieved in terms of cooking temperature and timing controls.

Attempts to utilize microwave ovens as the sole cooking expedient, however, have suffered from drawbacks. Unfortunately, while microwave cooking equipment does the desired job of "cooking" food in a relatively short period of time, the resultant "cooked" food retains a somewhat raw or uncooked appearance. Microwaved poultry, for example, fails to achieve the desired "golden brown" color, and instead appears white. Consequently, it has been recommended practice (Julia Child, *From Julia Child's Kitchen*, published by Alfred A. Knopf, New York 1975, page 641) to brown poultry, such as chicken, first in a conventional oven, then finish it in a microwave oven. Similar problems obtain with pastries, such as cakes and pies; fish food; meats, such sausage; eggs; mushrooms and the like, which microwave to an unplatable white or grey color.

One approach suggested heretofore to minimize the non-browning effects of microwave-cooking equipment has involved the use of an application to the foods of colored sauces previously marketed for utilization in spicing foods, eg., barbeque sauces. This technique, although of limited success, has not proved totally satisfactory in offering only a limited, highly spiced diet and in failing completely with certain foods, eg., pastries.

Thus, a search has continued in the art for an expedient offering a versatile and effective solution to the non-browning characteristic of microwave-cooking equipment.

OBJECTS OF THE PRESENT INVENTION

Accordingly, it is the primary object of the present invention to provide a novel composition useful in microwave-cooking to remedy the problem of non-palatable appearance heretofore encountered.

Another object of the present invention is to provide a novel composition advantageously useful as a browning agent in microwave-cooking.

An additional object of the present invention is to provide a novel composition which is an efficient browning agent on a wide variety of foods when such foods are cooked in microwave equipment.

A further object of the present invention is to provide a novel composition which advantageously allows a wide variety of foods to be cooked to a pleasant appearance in microwave equipment without the need to utilize highly spiced adjuvants and condiments.

Still another object of the present invention is to provide a novel browning agent for microwave-cooking which greatly expands the ability of microwave-cooking equipment to serve as the sole cooking equipment required to satisfactorily prepare foods.

DESCRIPTION OF SPECIFIC EMBODIMENTS

The above and other objects are achieved and are features of the novel composition of the present invention which comprises an aqueous syrup heating one part by volume of a granular disaccharide through the melting, carmelizing, foaming, and foam-breaking stages to form a dark brown liquid, after foam breakdown, maintaining said dark liquid at said foam-breaking temperature for an additional period of up to about one minute, then optionally allowing the resultant liquid to cool at room temperature without solidifying, then, to the resultant brown cooled liquid, adding from about 1.5 to about 2.5 parts water per part by volume said starting disaccharide, and heating the resultant mixture to a boil to form a uniform aqueous syrup which is crystal-free at room temperature.

In accordance with the present invention, the starting disaccharide suitably may be any carmelizable disaccharide, including sucrose, maltose, lactose, mixtures thereof, and the like. Due to its cost and ready availability and further to the universal appeal of the texture and taste of compositions produced therefrom, sucrose is the preferred disaccharide for use in the present syrup.

In its broadest aspects, the invention embraces utilizing the disaccharide in the ingredient subjected to the melting as the sole ingredient. Preferably, however, in the starting ingredient, a minor amount, more preferably from about 0.01 to about 0.1 part per part by volume said disaccharide, of a monosaccharide is incorporated with the disaccharide prior to the melting step to reduce or eliminate a slight bitterness which sometimes is detectable in syrups formed from disaccharides alone. Any carmelizable monosaccharide suitable may be employed, including glucose (ie., dextrose), fructose, levulose. mixtures thereof, eg., honey, and the like.

In the preferred procedures for preparing the novel syrups of the present invention, the dark brown liquid obtained after foam breakdown is held at the temperature obtaining for up to about 30 seconds to ensure completeness of the treatment, is then allowed to cool for up to about one minute, more preferably about 30 seconds, the water employed in the water addition step is cold, and the final boiling step is carried out over a period ranging up to about ten minutes.

The resultant syrup produced in accordance with the present invention advantageously may be employed in such form in a wide variety of ways to effect a desired browning of any food cooked in a microwave oven. To effect such browning, the agent syrup of the present invention may be added as a recipe ingredient in the preparation of the particular food at the site of the cooking or may be so incorporated by a manufacturer of the food product, eg., frozen pies, prior to packaging for shipment to consumer distribution agencies. In its more common useage, the browning composition of the present invention is basted onto the surface of foods immediately prior to packaging or, even more commonly, prior to insertion in a microwave oven.

Such basting, for example, advantageously allows poultry, such as chicken and turkey, other meats, such as sausage, "fried" eggs, mushrooms, and pastries, such as pies and cakes, to be cooked to an appealling browned color in a microwave oven.

Inasmuch as taste sensitivities of individuals vary, some persons may detect a degree of sweetness which is ever slight in the present browning agents. To adapt the syrups of the present invention for universal use, to the more preferred compositions, salt is added in a minor amount, usually in the range of from about 0.01 to about 0.1 part per part by volume said starting disaccharide, to neutralize any sweetness obtaining. To avoid effecting an increased darkening of the syrup during the described heating steps including melting through finally boiling, salt where it is employed preferably is incorporated into the ultimate syrup.

The present invention will be more readily understood from the following description of specific examples of the browning agents of the present invention and their uses.

EXAMPLE 1

A mixture of one cup of granular sucrose, one teaspoon of dextrose, and one teaspoon of honey was heated until it melted, reached the dark carmel stage, foamed, and then stopped foaming to produce a dark liquid. Heating of the dark liquid was continued for about 30 seconds, and then heat was withdrawn with the liquid being allowed to cool at room temperature for about 30 seconds. To the cooled liquid was then added two cups of cold water, which caused a slight amount of "carmel" to form in the water, and the resultant mixture was heated to a boil and maintained at boil for about 10 minutes to produce a dark syrup, which on cooling to room temperature was a crystal-free, stable aqueous liquid. About one teaspoon of salt was added then to produce a universal browning agent of the invention for micrwave-cooking.

EXAMPLE 2

A frozed turkey was brushed with the syrup of Example 1 which provided a coating on the turkey's skin that remained where it was applied and did not run off. The resultant coated bird was then cooked in a microwave oven under the conditions recommended for turkeys in that oven.

The resultant cooked turkey had a golden brown color resembling the color of a bird cooked in a conventionally heated oven.

The procedure was repeated for a turkey of comparible size. The uncoated turkey had an unappealling white-colored skin.

EXAMPLE 3

The procedure of Example 2 was repeated, excepting frozen chicken parts were substituted for the turkey.

The chicken microwaved with the syrup coating of the present invention was an appealling brown, while the uncoated chicken parts were an unattractive white color.

EXAMPLE 4

The procedure of Example 2 was repeated excepting links of pork sausages were substituted for the turkey.

The uncoated sausages were an unappealling grey color after cooking, while those coated and cooked according to the present invention were a dark brown.

EXAMPLE 5

The procedure of Example 2 was repeated using frozen apple pies instead of the turkeys.

The pies treated according to the present invention had golden crusts after cooking; the untreated pies had unattractive white crusts.

EXAMPLE 6

The procedure of Example 2 was repeated except that dinners rolls available commercially which require only heating prior to use were employed in place of the turkeys.

The resultant uncoated rolls after cooking remained a pale white, while those treated and cooked according to the present invention had a pleasant browned color.

EXAMPLE 7

Example 2 was repeated, excepting that eggs which were being cooked "sunny-side-up" were substituted for the turkeys.

The untreated eggs had totally white "whites"; the eggs coated with the syrup of the present invention cooked to an appearance having slightly browned edges resembling conventional pan-fried eggs.

EXAMPLE 8

A repetition of Example 2 was made with the exception that egg-batter and bread crumb-coated mushrooms were employed in place of the turkeys.

The resultant mushrooms which were untreated were an unpleasant pale white color, while those treated and cooked by the present invention were an attractive browned color.

EXAMPLE 9

The procedure of Example 2 was repeated excepting french fry-cut potatoes were substituted for the turkeys.

The french fried potatoes produced by the present invention treatment were a much more golden color than the untreated samples.

EXAMPLE 10

The procedure of Example 2 was again repeated, except that haddock steaks were employed in place of the turkeys.

The cooked, untreated fish was an unpleasing white, while the fish steaks coated and cooked in the microwave oven by the present invention were pleasingly golden colored.

The foods prepared in Examples 2–10 by use of the browning agent of the present invention, in addition to having a more appealing appearance, further suprisingly were characterized by an enhanced flavor as compared to the respective untreated food samples.

EXAMPLES 11–13

The procedure of Example 1 was repeated to prepare a browning agent syrup of the present invention in three additional runs, excepting that each, in turn, one teaspoon maltose, two teaspoons "Dianalt"—a dehydrated maltose, and two teaspoons dextromaltose were substituted for the dextrose and honey. A fourth sample was prepared eliminating the dextrose and honey.

The resultant dark brown syrups produced had the properties of the syrup of Example 1 of room stability and as a browning agent and flavor enhancer when used on microwave-cooked foods.

Although, to retain the universal applicability of the compositions of the present invention as microwave-cooking browning agents, spices and condiments, other than salt, preferably are absent from the compositions, the invention does embrace the incorporation of spices and other condiments in formulating and using the compositions on particular foods. As in the case of salt, such adjuvants, when employed preferably are added following the heating steps of the syrup preparation.

What is claimed is:

1. A microwave-cooking browning agent consisting essentially of an aqueous syrup prepared by heating one part by volume of a granular disaccharide until said disaccharide melts, then carmelizes, and then foams, and then until said foaming stops to form a dark brown liquid, after said foaming stops, maintaining said dark liquid at the resultant temperature for an additional period of up to about one minute, then allowing the resultant liquid to cool without solidifying, then, to the resultant brown cooled liquid, adding from about 1.5 to about 2.5 parts water per part by volume said disaccharide, and heating the resultant mixture to a boil to form a uniform aqueous syrup which is crystal-free at room temperature, and adding to said resultant syrup a minor amount of salt to neutralize any sweetness to produce a resultant aqueous syrup which, when applied as a coating to any raw food product selected from the group consisting of meats, poultry, fish, eggs, french fry-cut potatoes, and pie crust and the resultant coated food product is cooked in a microwave oven, produces a cooked food product which is browned.

2. The microwave-cooking browning agent according to claim 1 wherein said disaccharide is selected from the group consisting of sucrose, maltose, lactose, and mixtures thereof.

3. The microwave-cooking browning agent according to claim 2 wherein said disaccharide is sucrose.

4. The microwave-cooking browning agent according to claim 1 wherein a minor amount of a monosaccharide is added to said disaccharide prior to said melting step.

5. The microwave-cooking browning agent according to claim 4 wherein said monosaccharide is selected from the group consisting dextrose, fructose, levulose, and mixtures thereof.

6. A food composition which is browned without being sweetened when cooked in a microwave oven, said composition including at the surface thereof said browning agent of claim 1.

7. The food composition according to claim 6 wherein said composition is packaged.

8. A method of browning a food composition comprising applying to said food composition said browning agent of claim 1 and subjecting the resultant treated food composition to cooking in a microwave cooking device.

* * * * *